(12) United States Patent
Johnson et al.

(10) Patent No.: US 6,198,860 B1
(45) Date of Patent: Mar. 6, 2001

(54) OPTICAL WAVEGUIDE CROSSINGS

(75) Inventors: Steven G. Johnson, St. Charles, IL (US); Shanhui Fan, Somerville; Pierre R. Villeneuve, Boston, both of MA (US); Christina Manolatou, Piraeus (GR); Hermann A. Haus, Lexington; John D. Joannopoulos, Belmont, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/158,455

(22) Filed: Sep. 22, 1998

(51) Int. Cl.$^7$ ........................................... G02B 6/26
(52) U.S. Cl. .................. 385/28; 385/27; 385/1; 385/24; 385/39; 385/40; 385/50
(58) Field of Search ................... 385/28, 29, 24, 385/9, 27, 15, 129, 16, 42, 32, 14, 1, 39, 40, 50

(56) References Cited

U.S. PATENT DOCUMENTS

| | | |
|---|---|---|
| 3,095,549 | 6/1963 | Butler . |
| 4,675,620 | 6/1987 | Fullerton ........................ 333/1 |
| 4,961,619 | 10/1990 | Hernandez-Gil et al. ......... 385/45 X |
| 5,157,756 | 10/1992 | Nishimoto ........................ 385/129 |
| 5,784,400 | 7/1998 | Joannopoulos et al. ............ 372/96 |
| 6,101,300 | * 8/2000 | Fan et al. ........................ 385/27 |

FOREIGN PATENT DOCUMENTS 196 28 355 A1    3/1997 (DE) .

OTHER PUBLICATIONS

Aretz K. et al.: "Reduction of Crosstalk and Losses of Intersecting Waveguide", Electronics Letters, GB IEE Stevenage, vol. 25, No. 11, May 25, 1999, pp. 730–731.

* cited by examiner

Primary Examiner—Phan T. H. Palmer
(74) Attorney, Agent, or Firm—Samuels, Gauthier & Stevens, LLP

(57) ABSTRACT

An optical waveguide structure including a first waveguide, a second waveguide that intersects with the first waveguide, and a photonic crystal resonator system at the intersection of the first and second waveguides. In accordance with another embodiment there is provided an optical waveguide crossing structure including a first waveguide that propagates signals in a first direction, a second waveguide that intersects with the first waveguide and propagates signals in a second direction, and a photonic crystal crossing region at the intersection of the first and second waveguides that prevents crosstalk between the signals of the first and second waveguides. In accordance with another embodiment of the invention there is provided an optical waveguide structure including a first waveguide, a second waveguide, and a resonator system at the intersection of the first and second waveguides, the intersection possessing a first mirror plane that is parallel to the first waveguide, the resonator system supporting a first resonant mode that includes different symmetry with guided modes in the first waveguide with respect to the first mirror plane, the resonator system substantially reduces crosstalk from the second waveguide to said first waveguide.

44 Claims, 15 Drawing Sheets

HOLE RADIUS = 0.2a

OPTICAL WAVEGUIDE CROSSINGS

SPONSOR INFORMATION

This invention was made with government support under Grant No. 9400334-DMR awarded by the National Science Foundation. The government has certain rights in the invention.

BACKGROUND OF THE INVENTION

The invention relates to the field of optical waveguide crossings.

In constructing integrated optical circuits, space constraints and the desire to operate on multiple input waveguides necessitate waveguide crossings. It is crucial that the crossings be as efficient as possible. A typical application is optical switching, where a large number of inputs are directed to as many outputs, and crossing is necessary in order for each input to connect to every output. Simplicity of fabrication on small lengthscales means that the waveguides must actually intersect, and cannot simply pass over one another. Any additional three-dimensional structure adds considerable manufacturing difficulty.

FIG. 1 is a block diagram of a conventional crossing arrangement 100. In a perfect crossing arrangement, optical modes 102 propagate with 100% transmission (throughput) from an input waveguide 104 to an output waveguide 106 on the opposite side of a crossing intersection 108, with no reflection and with 0% transmission (crosstalk) to the crossing waveguide 110. The attainment of low crosstalk is especially important since it is generally difficult to separate two signals that have been mixed, whereas low transmission can be remedied by a simple amplifier.

Previous works on waveguide crossings have dealt with waveguides based on index confinement (sometimes thought of as total internal reflection, the most familiar example of which is the fiber-optic cable). High (but not perfect) throughput can be attained in such devices, but only in the limit of very long or short wavelengths compared to the waveguide size. It is desirable to achieve perfect crossings for any wavelength, including the case where the waveguide width is of the same order as the wavelength, which allows maximum miniaturization. The design of good crossings in conventional devices has been a matter of trial and error.

SUMMARY OF THE INVENTION

The invention provides for perfect crossings in which optical modes propagate with 100% transmission (throughput) from an input waveguide to the output waveguide on the opposite side of a crossing, with no reflection and with 0% transmission (crosstalk) to the crossing waveguide. Moreover, the crossing is analyzed by a simple theory that enables the design of perfect crossings in any photonic crystal waveguide, and good crossings in other settings as well. In this theory, the intersection is treated as a resonant cavity, and perfect crossing is achieved when the cavity modes satisfy a simple symmetry constraint.

In one embodiment of the invention, photonic crystal waveguides are utilized, which provide an ideal setting for the application of this theory. Photonic crystals are materials with band gaps that restrict the propagation of light in certain frequency ranges. Their discovery in recent years has caused a rethinking of conventional methods for manipulating light, and has led to proposals for many novel optical devices. A linear defect in a photonic crystal is the basis for a new kind of waveguide, which relies on the band gap restriction instead of index confinement to prevent light from escaping. Similarly, a defect at a single location (a point defect) creates a resonant cavity, which traps light in a small region. The waveguide crossing design of the invention makes uses of both of these phenomena.

The high losses associated with bends in conventional waveguides, together with the typical situation of parallel inputs, has pushed conventional designers to work with shallow crossing angles that make it even more difficult to achieve low crosstalk. In photonic crystals, however, it is possible to make sharp waveguide bends with 100% transmission, obviating the need for shallow-angle crossings. In the invention, therefore, the designs can be restricted to perpendicular intersections, which simplify the attainment of perfect crossings. The same principles could be applied to slightly non-perpendicular crossings, with some loss of efficiency and simplicity.

Accordingly, in accordance with one embodiment of the invention there is provided an optical waveguide structure including a first waveguide, a second waveguide that intersects with the first waveguide, and a photonic crystal resonator system at the intersection of the first and second waveguides.

In accordance with another embodiment there is provided an optical waveguide crossing structure including a first waveguide that propagates signals in a first direction, a second waveguide that intersects with the first waveguide and propagates signals in a second direction, and a photonic crystal crossing region at the intersection of the first and second waveguides that prevents crosstalk between the signals of the first and second waveguides.

In accordance with another embodiment of the invention there is provided An optical waveguide structure including a first waveguide, a second waveguide, and a resonator system at the intersection of the first and second waveguides, the intersection possessing a first mirror plane that is parallel to the first waveguide, the resonator system supporting a first resonant mode that includes different symmetry with guided modes in the first waveguide with respect to the first mirror plane, the resonator system substantially reduces crosstalk from the second waveguide to said first waveguide.

BRIEF DESCRIPTION OF THE DRAWINGS

FIGS. 7A and 7B a field graphs of the defect states produced by a defect rod size 0.3a;

DETAILED DESCRIPTION OF THE ILLUSTRATED EMBODIMENTS

Figure 1:
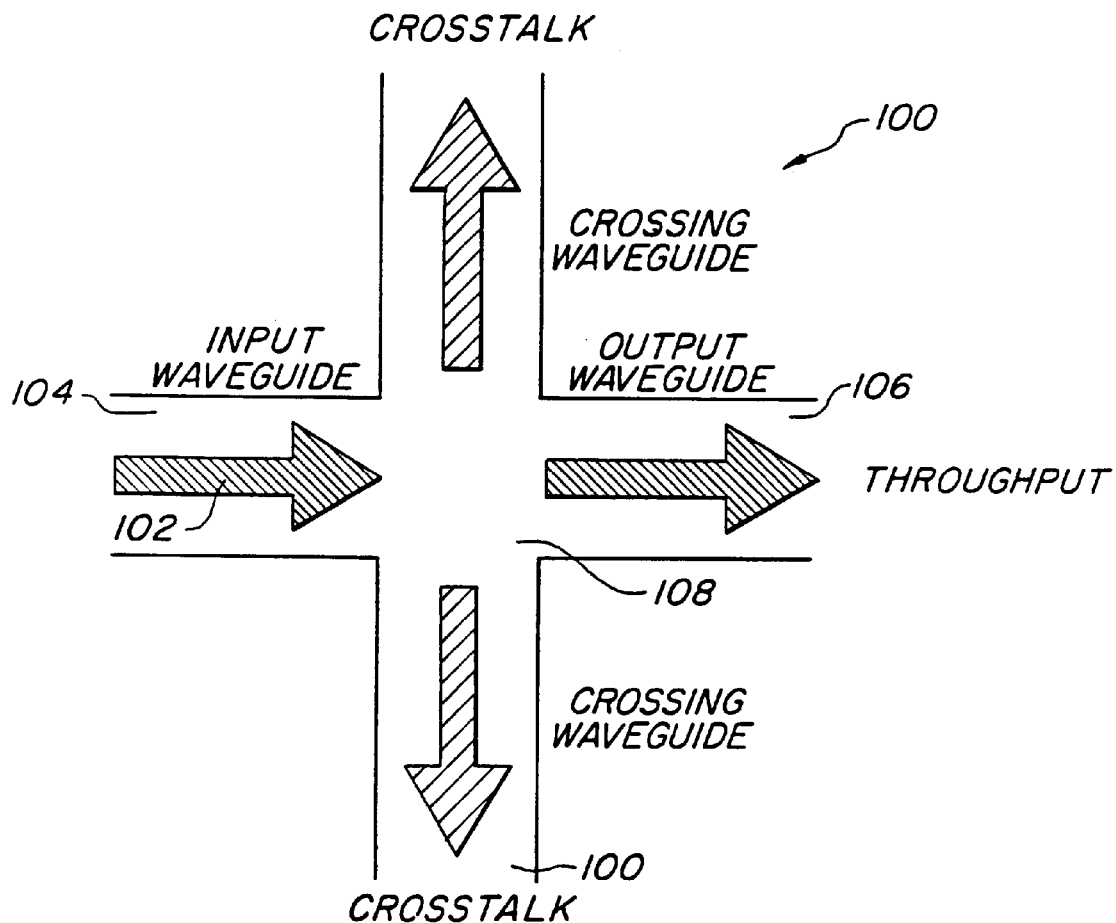
FIG. 1 is a diagram of a conventional crossing arrangement.
Figure 2:
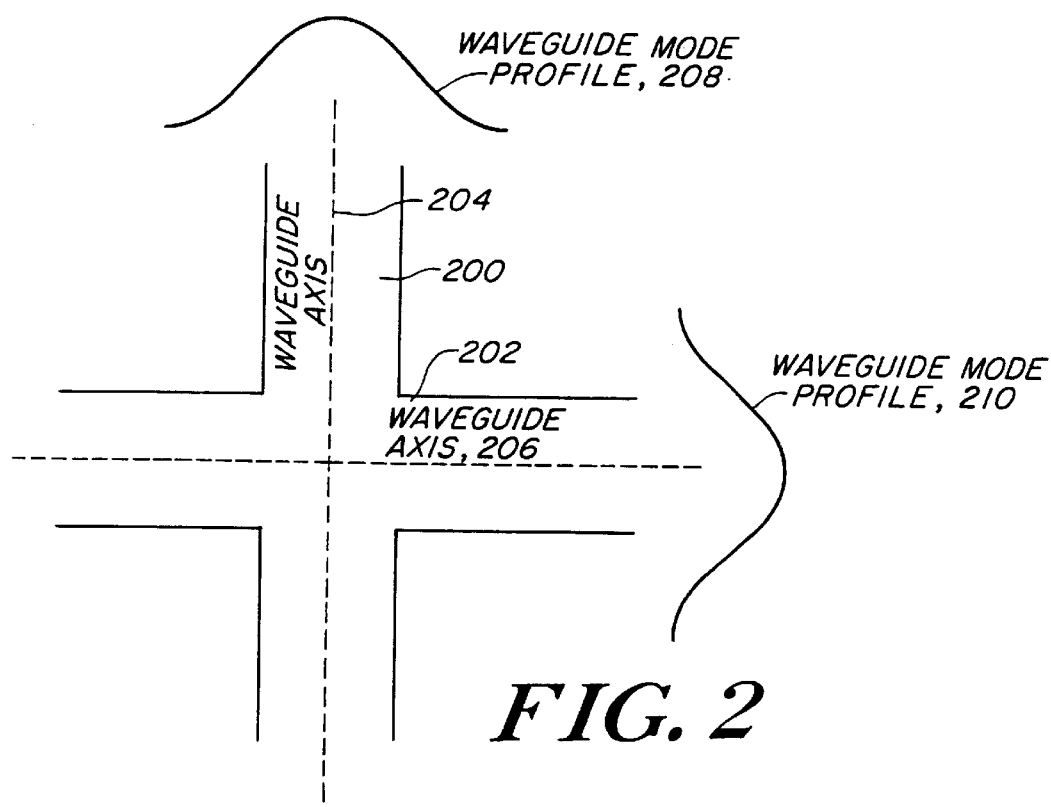
FIG. 2 a diagram of intersecting waveguides showing respective waveguide axes and waveguide mode profiles.
Figure 3:
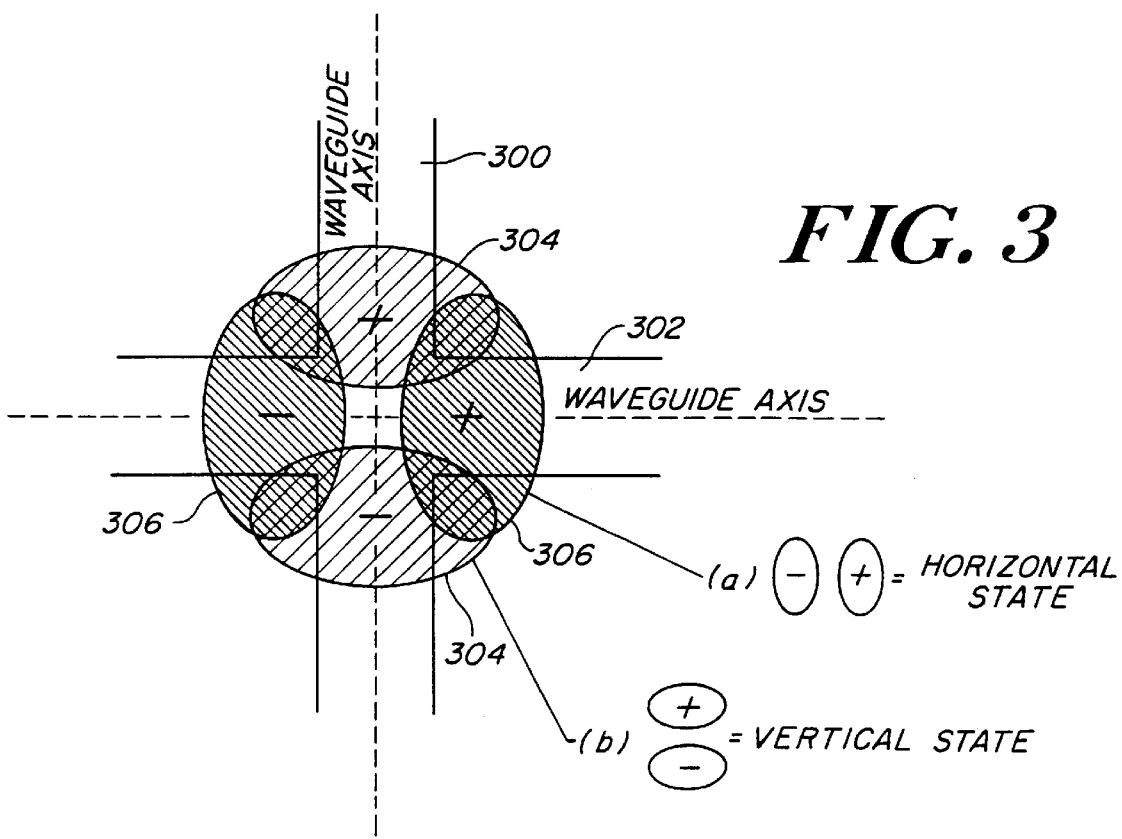
FIG. 3 is a diagram of intersecting waveguides and symmetric resonant cavity states.

There are four basic elements that form the foundation of the optical waveguide crossings of the invention: (1) Each waveguide is single-mode in the desired frequency range and the mode is symmetric with respect to the waveguide axis, as illustrated in FIG. 2. While the symmetric case is depicted for purposes of illustration, it will be appreciated that the mode could also be anti-symmetric with respect to the waveguide axis. FIG. 2 is a diagram of intersecting waveguides 200 and 202 showing respective waveguide axes 204 and 206, and waveguide mode profiles 208 and 210; (2) the intersection supports resonant modes, by which resonant tunneling occurs; (3) radiation losses from the decay of these modes is small (ideally, zero) compared to decay into the waveguides; and (4) the resonant modes have definite symmetry properties-each one is symmetric with one waveguide axis and anti-symmetric with the other, as illustrated in FIG. 3. FIG. 3 is a diagram of intersecting waveguides 300 and 302 and symmetric resonant cavity states 304 and 306. Each of the cavity states is symmetric with respect to one waveguide axis and anti-symmetric with respect to the other axis.

The first condition is achieved simply by providing the waveguide mirror symmetry with respect to its axis (which is almost always the case anyway). Then, if one deals with the fundamental mode of the waveguide, it automatically has the requisite symmetry. The single-mode condition is also easily achieved, for example by choosing the waveguide to have an appropriate width.

The second condition, which treats the intersection as a resonant cavity, means that any resonant states associated with the intersection must decay sufficiently slowly for coupled mode theory to hold. It turns out that this is not a very strong condition, and the decay time can be made arbitrarily long simply by surrounding the intersection with layers of bulk photonic crystal. In some sense, this element of the invention is more a way of looking at the intersection than a condition that is imposed.

The third condition requires that the resonant modes decay mostly into the adjacent waveguides rather than into radiation. The problem of building resonant cavities with low radiation losses has been extensively studied, and solutions are well known. For example, in a photonic crystal, radiation losses are completely forbidden by the band gap. Index confinement and metallic guides for microwaves are other standard ways of directing mode decay.

Figure 4:
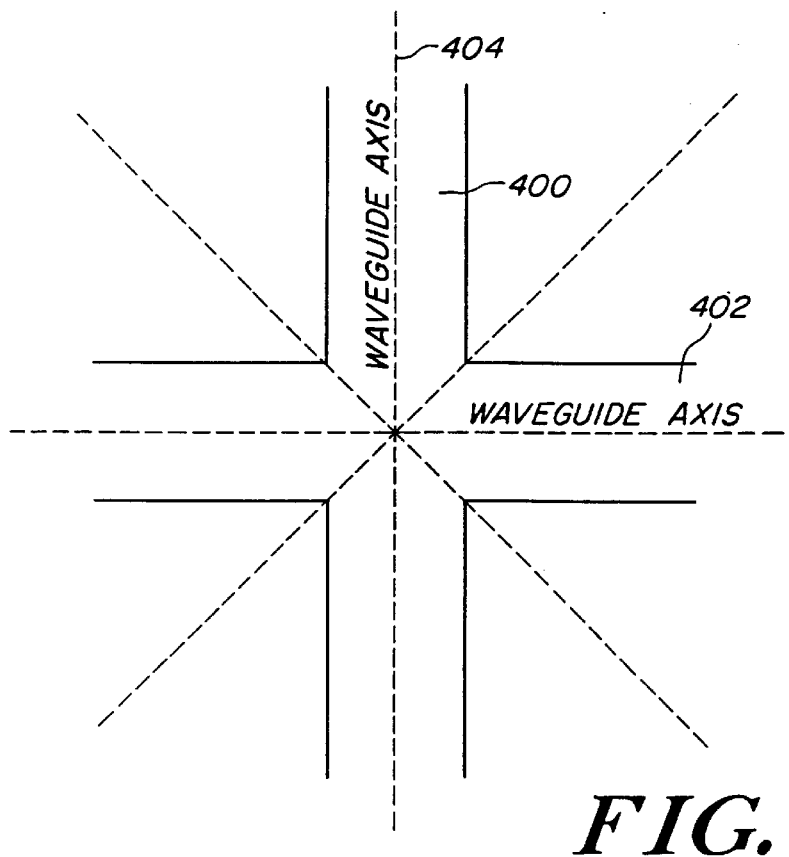
FIG. 4 is a diagram of intersecting waveguides with mirror planes (dashed lines) of the intersection if it has $C_{4v}$ symmetry.

Finally, the symmetry of the resonant modes must be set correctly. Fortunately, this is also straightforward. It is well known that resonant states in photonic crystals, for example, can be constructed with nearly any desired symmetry. In particular, as long as the intersection is sufficiently symmetric ($C_{4v}$ symmetry, corresponding to the mirror planes shown in FIG. 4), any degenerate higher-order defect states will automatically have the symmetry required. FIG. 4 is a diagram of intersecting waveguides 400 and 402 with mirror planes (dashed lines) 404 of the intersection if it has $C_{4v}$ symmetry. The desired symmetry in the modes may also be obtained without $C_{4v}$ symmetry. It is especially important that, in the desired frequency range, there be no modes that are symmetric with respect to both waveguide axes. This last constraint is not hard to satisfy. Typically, one has a whole taxonomy of different mode conditions to choose from, and it is easy to find a configuration that has desired properties.

Once all the aforementioned elements are in place, the operation of the perfect crossing is quite simple, and relies on the fact that each guided mode only "sees" one defect state in the associated resonant cavity.

When a guided mode is incident upon the crossing from one of the waveguides, it can only couple to the resonant state that is symmetric with respect to the axis of that waveguide. The other resonant state, which is anti-symmetric, is orthogonal to that guided mode by symmetry. Correspondingly, the symmetric resonant state can only decay into the input and output waveguides, since this state is orthogonal to the modes in the crossing waveguide.

Figure 5:
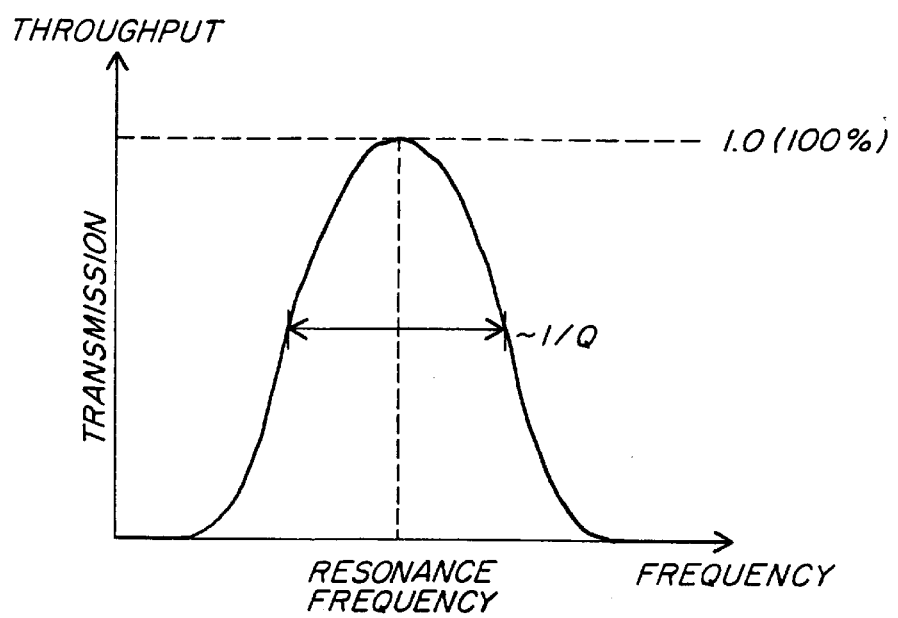
FIG. 5 is a graph of the throughput predicted in an exemplary perfect crossing of the invention by coupled-mode theory.

Thus, as far as the incident guided mode is concerned, the situation is described by simple one-dimensional resonant tunneling. There is an input waveguide, an output waveguide, and a resonant cavity in between. The crossing waveguide is effectively invisible. One-dimensional tunneling is well understood, and is described by coupled mode theory. The result of this theory is that the transmission is given by a bell-shaped Lorentzian curve, with 100% throughput when the frequency of the guided mode matches the resonance frequency of the cavity. FIG. 5 is a graph of the throughput predicted in an exemplary perfect crossing of the invention by coupled-mode theory: a Lorenztian reaching 100% transmission at the resonance frequency, with a width inversely proportional to Q.

When the frequency of the guided mode is not on resonance, throughput drops below 100%, and the balance of the energy goes into reflection. Also, any radiation losses from the resonant cavity will lower the throughput so that it never reaches 100%, preventing the crossing from being perfect. In any case, crosstalk is always zero by symmetry.

The width of the resonance (the range of frequencies that achieve high throughput) is inversely proportional to the quality factor, Q, of the cavity. A high Q means that the resonant state decays slowly, and is obtained in a photonic crystal by surrounding the defect with many insulating layers of photonic crystal. A wider resonance (lower Q) can be achieved by decreasing the amount of insulation, thus making the cavity smaller. However, this approach has drawbacks as described hereinafter.

In real systems, there are constraints that prevent construction of the truly perfect crossings described by the aforementioned theory (in the absence of radiation losses). The main sources of imperfection are as follows. First, the input waveguide can directly couple with the crossing waveguides, e.g., by direct tunneling instead of resonant tunneling. Such coupling can be arbitrarily reduced by increasing the size of the resonant cavity, which increases amount of insulation between the waveguides. In a photonic crystal, for example, the coupling between the waveguides is lowered exponentially by each layer of intervening crystal. However, increasing the size of the cavity can either increase the Q of the cavity (narrowing the resonance) or permit new resonant modes that have the wrong symmetry.

Second, when the resonance is sufficiently wide (low Q), coupled-mode theory begins to break down. The throughput is no longer described by a simple Lorentzian, although the results can still be quite good as examples provided hereinafter will show. In any case, typically Q cannot be reduced arbitrarily without destroying the resonance altogether. Although these factors prevent absolutely perfect crossings, in practice excellent devices can be constructed that are far superior to what was available with conventional methods.

Next, the principles discussed above will be illustrated by designing an actual waveguide crossing in a photonic crystal, and its efficiency will be verified by using accurate simulations. It will be appreciated by those of skill in the art that the crossing that will be demonstrated is for a two-dimensional system, for simplicity of visualization and simulation; however, the same theory applies in three dimensions.

Figure 6B:
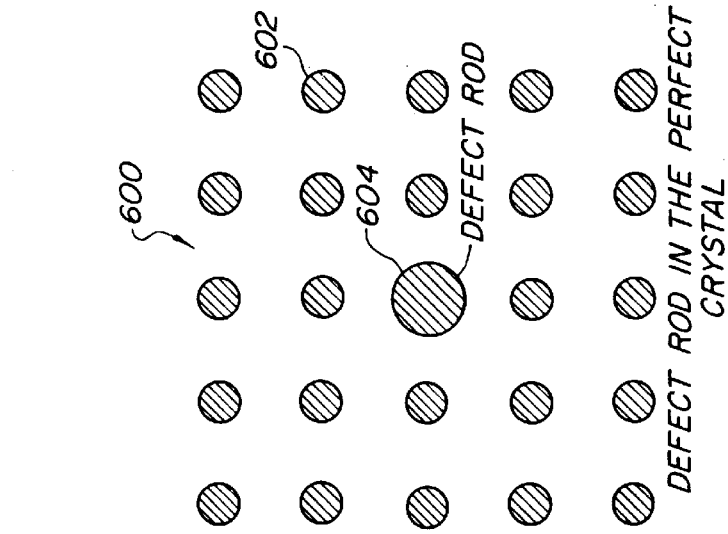
FIG. 6B is a top view of a two-dimensional square lattice of dielectric rods defining a photonic crystal with a band gap.

As the basis for the structure, a two-dimensional square lattice of dielectric rods 602 is used, which is a photonic crystal 600 with a band gap for TM-polarized light, as shown in FIG. 6B. Any structure with a band gap would do just as well. The rods have a radius of 0.2a (a being the lattice constant) and a dielectric constant of 11.56. The waveguides will be formed by removing a row or column of rods (any linear defect with a mirror symmetry plane would be sufficient).

Figure 6A:
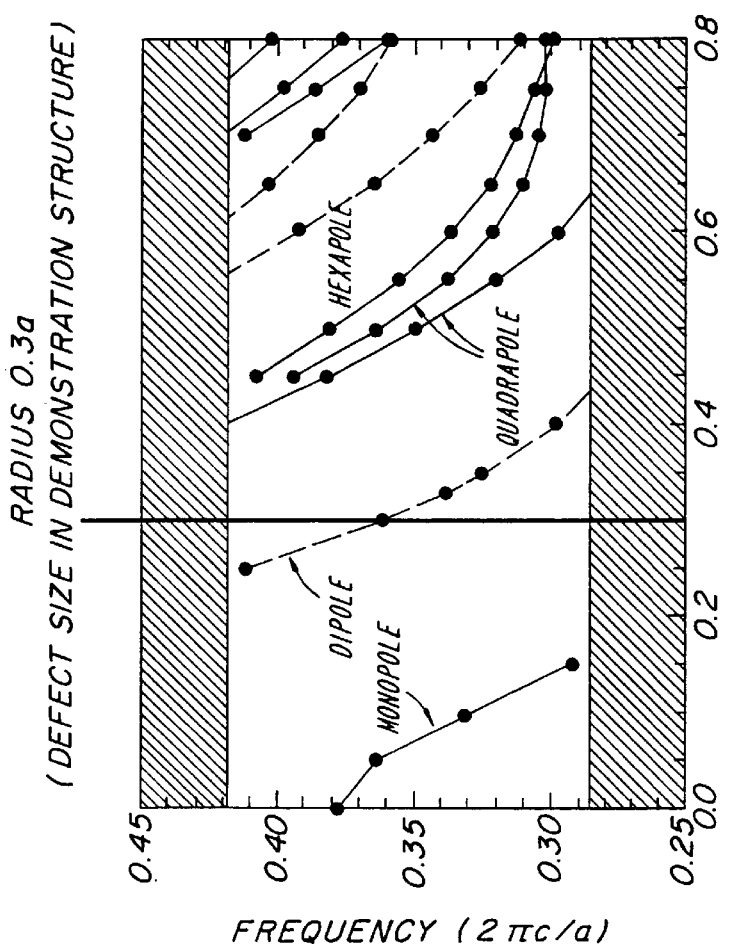
FIG. 6A is a graph of the defect states produced in a square lattice of dielectric rods when the radius of a single rod is varied.

In the intersection, a dielectric rod 604 with a radius 50% larger than that of the normal rods, is positioned surrounded by various numbers of layers of unperturbed photonic crystal to form the resonant cavity. This rod radius is known to induce a doubly-degenerate resonant cavity state having the required symmetry. FIG. 6A is a graph of the defect states produced in a square lattice of dielectric rods when the radius of a single rod is varied. The radius 0.3a is 50% larger than the radius of the ordinary rods. At that radius, the defect rod causes a pair of degenerate (equal frequency) states.

Figure 7B:
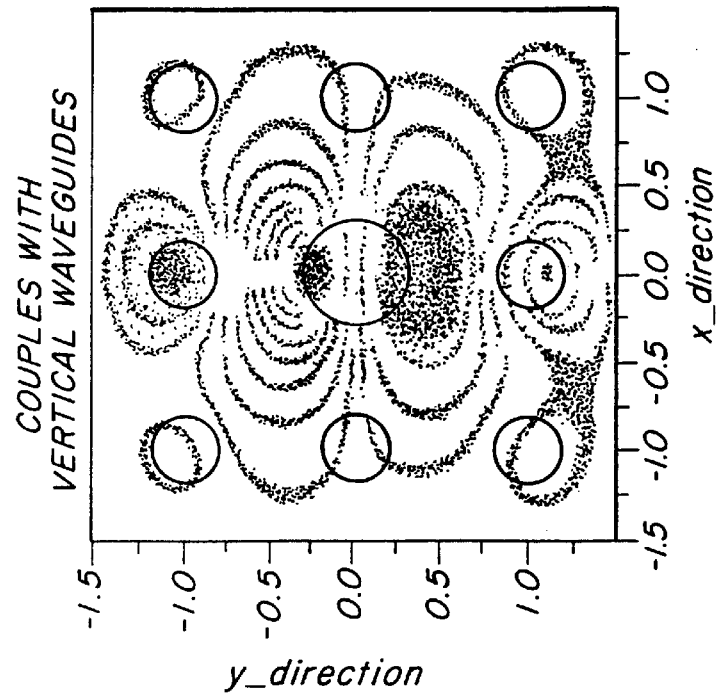
Figure 7B:
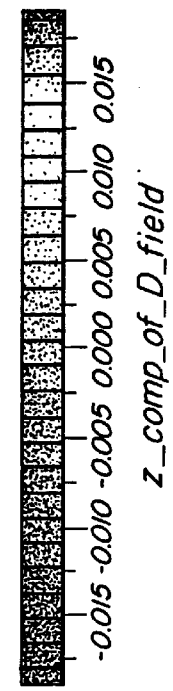
Figure 7A:
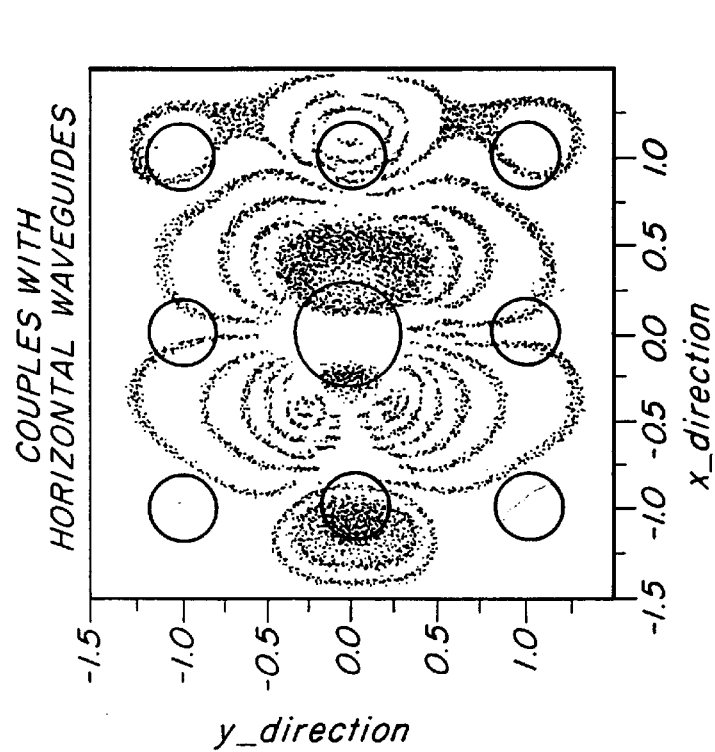
Figure 7A:
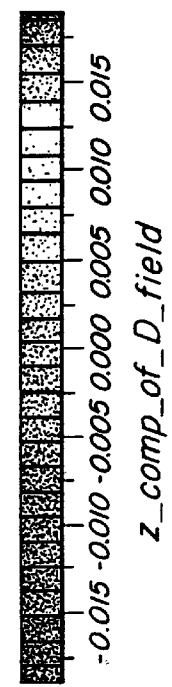

The two defect states are shown in FIGS. 7A and 7B. FIGS. 7A and 7B are electric field graphs of the defect states produced by the defect rod size 0.3a. These are the concrete realizations in the exemplary system of the abstract states described in FIG. 3. The shading indicates the value of the electric field component perpendicular to the image plane. This is the only electric field component in the TM polarization.

Figure 8A:
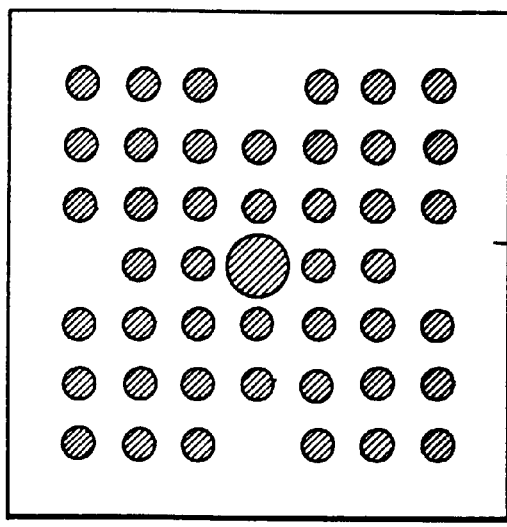
FIG. 8A is a top view of an exemplary 5×5 resonant cavity.
Figure 8B:
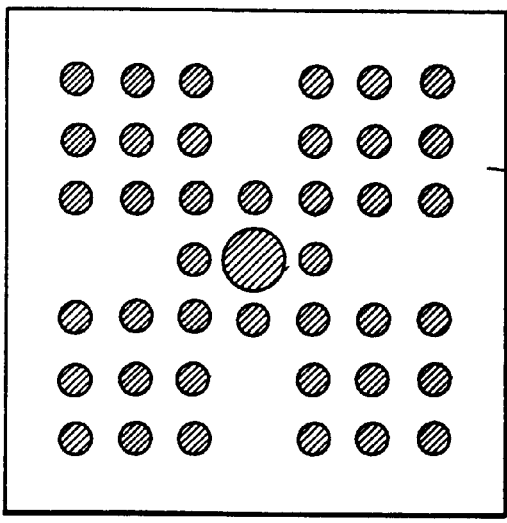
FIG. 8B is a top view of an exemplary 3×3 resonant cavity.
Figure 8C:
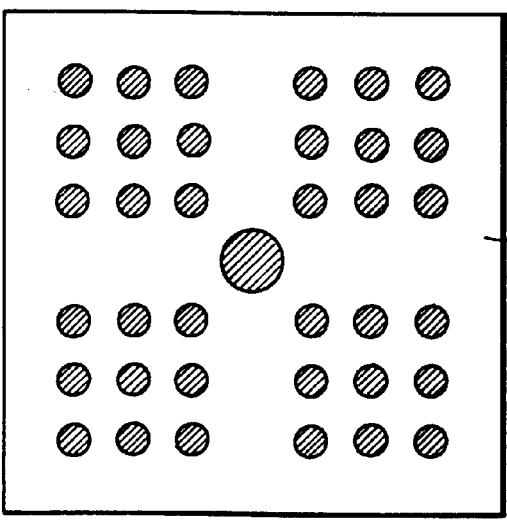
FIG. 8C is a top view exemplary 1×1 resonant cavity.

The resulting intersections, with both the waveguides and the resonant cavities, are shown in FIGS. 8A–8C. FIG. 8A is a top view of an exemplary 5×5 resonant cavity 800, FIG. 8B is a top view of an exemplary 3×3 resonant cavity 802, and FIG. 8C is a top view of an exemplary 1×1 resonant cavity 804 (with no photonic crystal layers between the defect rod and the waveguides).

To measure the behavior of this structure, a situation in which an input pulse with Gaussian profile is sent into the intersection from the left waveguide is modeled. The output energy to the right waveguide (throughput) and the top waveguide (crosstalk) is measured as a function of frequency, normalized by the input energy. The modeling is performed by a finite-difference time-domain simulation of Maxwell's equations.

Figure 9A:
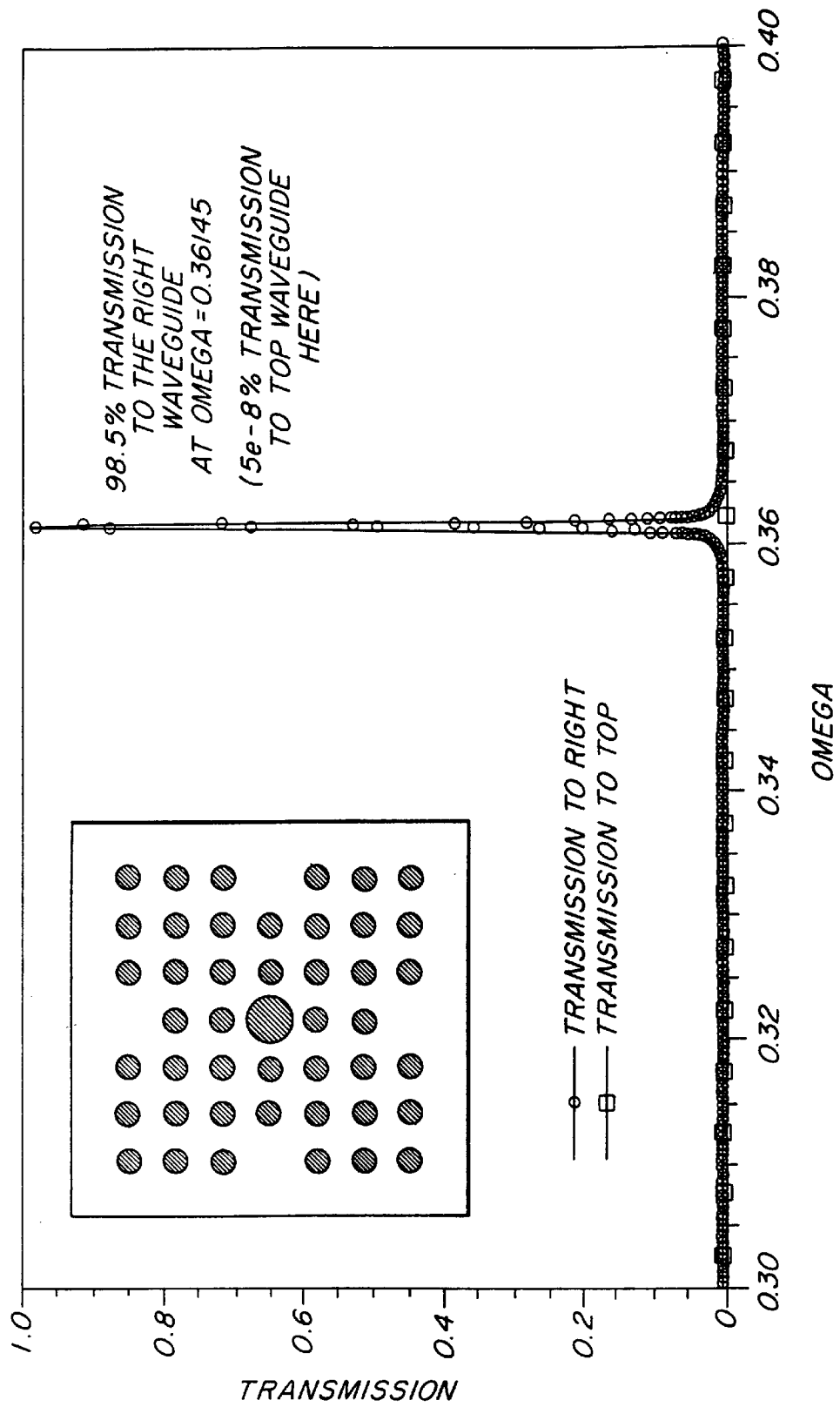
FIGS. 9A–9C are graphs the throughput and transmission to top waveguide (half the crosstalk) simulation results for the three intersection configurations illustrated in FIGS. 8A–8C, respectively.
Figure 9B:
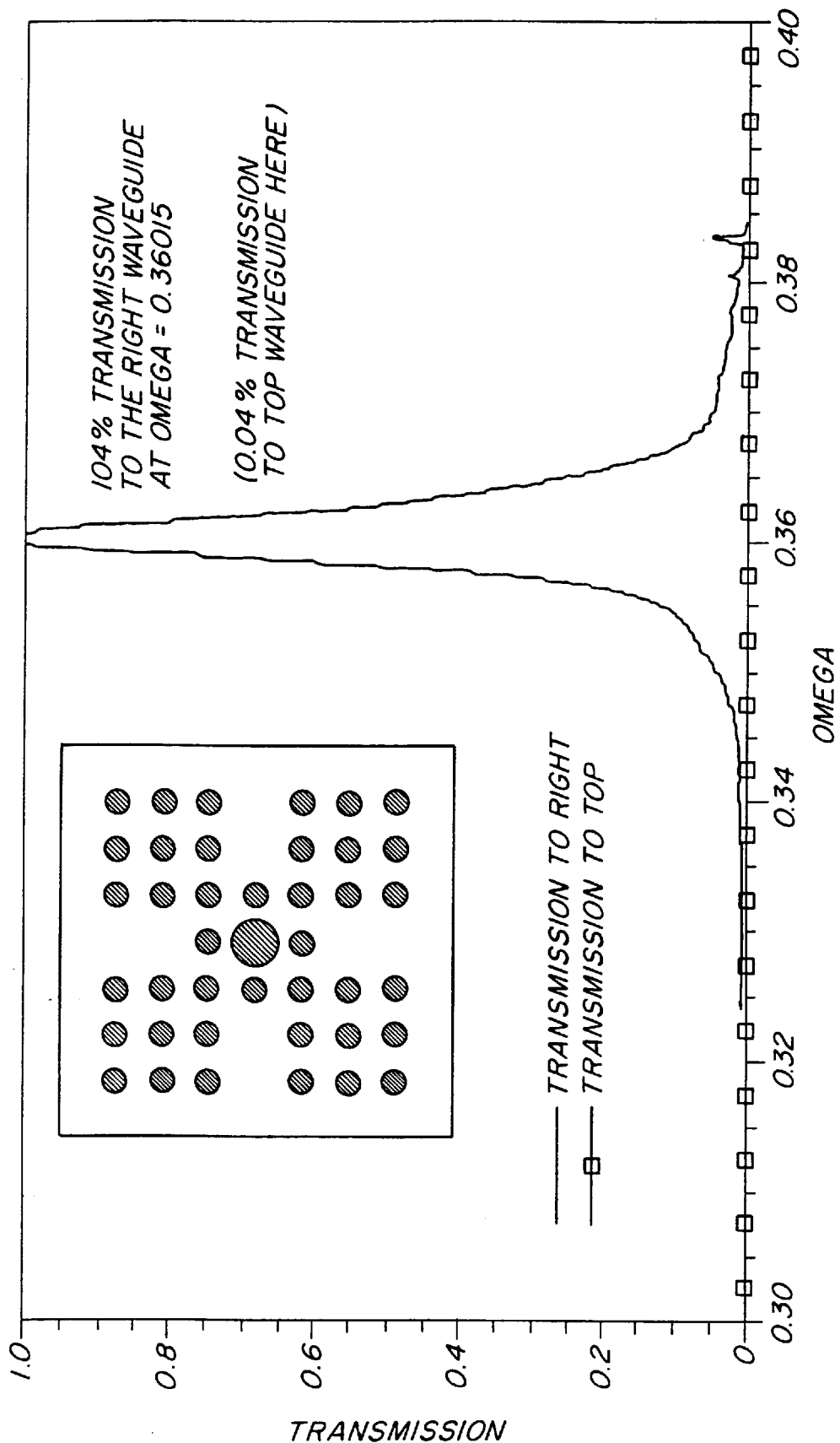
Figure 9C:
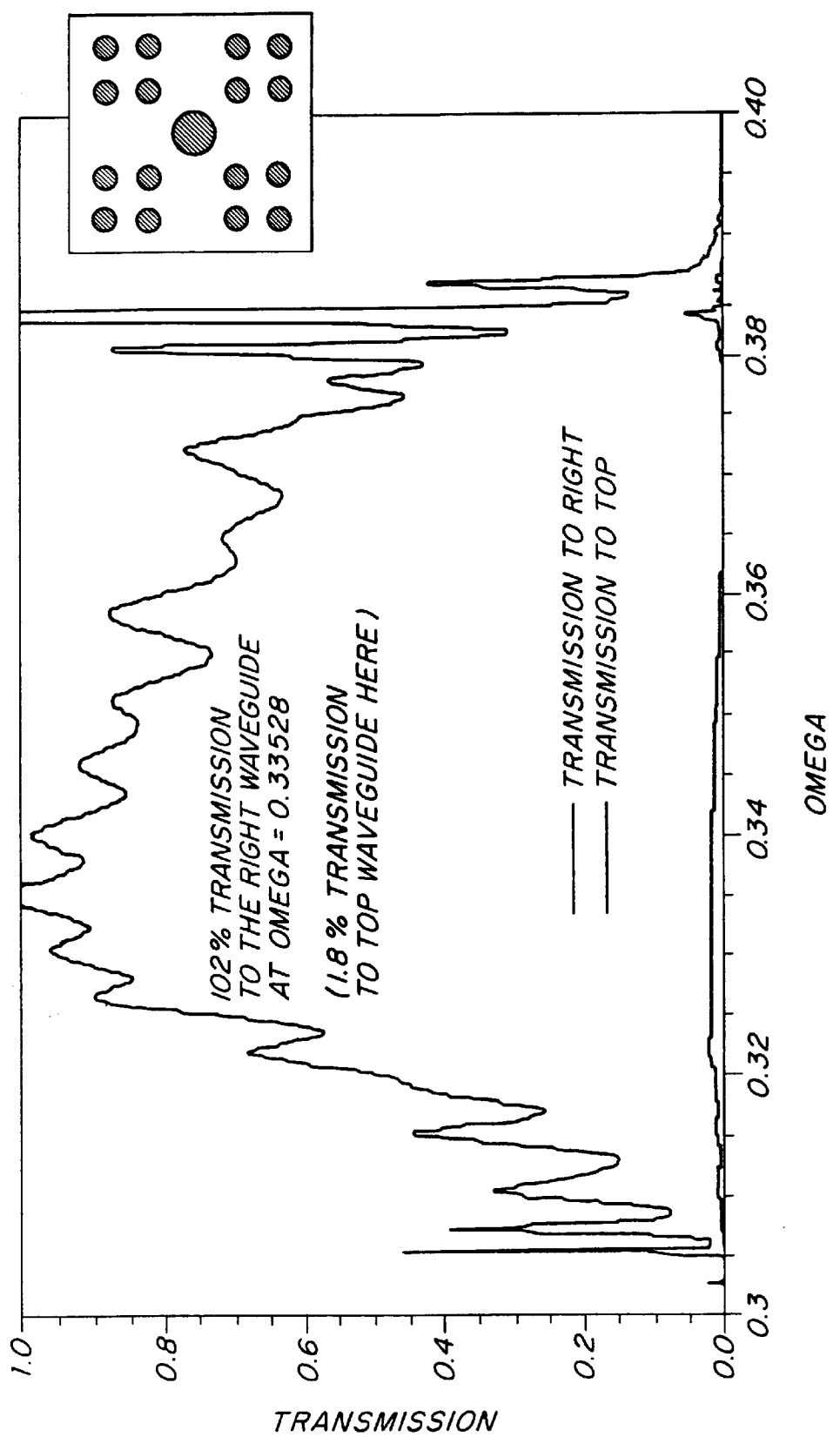

The resulting transmission profiles, for various resonant cavity sizes, are shown in FIGS. 9A–9C. FIGS. 9A–9C are graphs of the throughput and transmission to top waveguide (half the crosstalk) simulation results for the three intersection configurations illustrated in FIGS. 8A–8C, respectively.

As described by the theory, the throughput is given by a Lorentzian curve, with a peak of nearly 100% at the resonance frequency. Actually, the peak is slightly above 100% for some of the plots. This is an artifact of the simulation, caused by reflection from the boundaries. The transmission is overestimated by up to roughly 5%. Remarkably, even in the case of the 1×1 resonant cavity, for which no insulating layers of photonic crystal separate the defect rod from the waveguides, excellent throughput and low crosstalk are achieved. The Q of this cavity is low enough that coupled mode theory no longer applies, causing the transmission profile to deviate from a Lorentzian shape. The qualitative results, however, are much the same as for the larger defects, with the additional benefit that a much wider resonance is obtained.

Figure 10A:
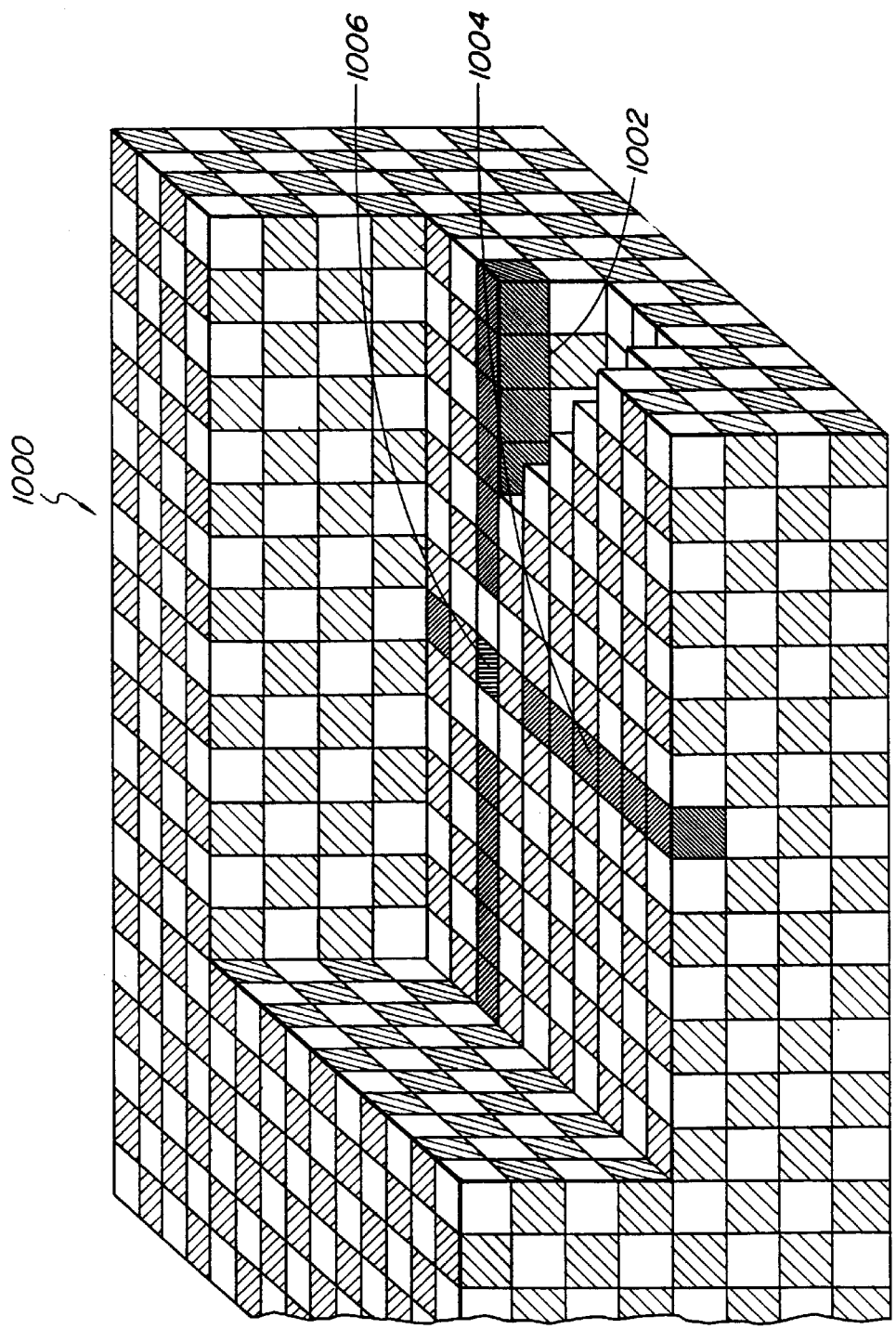
FIG. 10A a diagram of intersecting waveguides having a defect configured within a three-dimensionally periodic dielectric photonic crystal.

The ideal embodiment in three dimensions of a perfect crossing in accordance with the invention is in a three-dimensionally periodic dielectric photonic crystal with a full three-dimensional band gap, depicted abstractly in FIG. 10A. FIG. 10A is a diagram of intersecting waveguides 1002 and 1004, having a defect 1006, configured within a three-dimensionally periodic dielectric photonic crystal 1000. The principles that are used to achieve perfect crossings, however, can also be extended to other sorts of waveguides. The efficiency of such devices will be mostly limited by radiation losses.

Figure 10B:
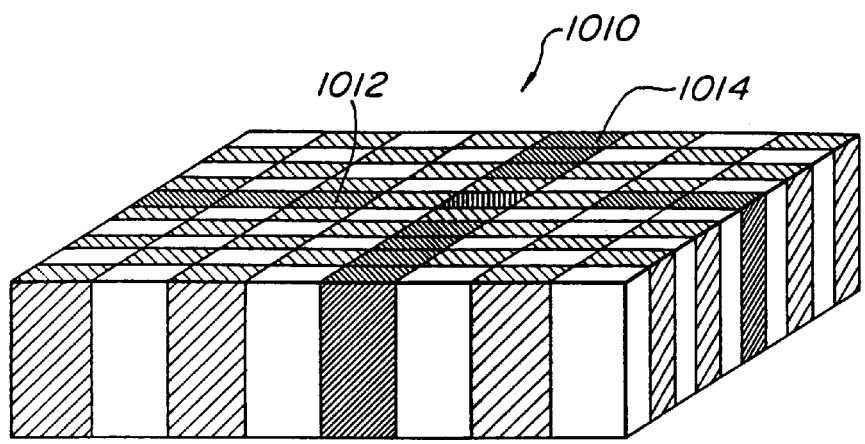
FIG. 10B a diagram of a two-dimensionally periodic dielectric structure including intersecting waveguides in which a photonic crystal confines light in two dimensions and index confinement is used in the third dimension.
Figure 11:
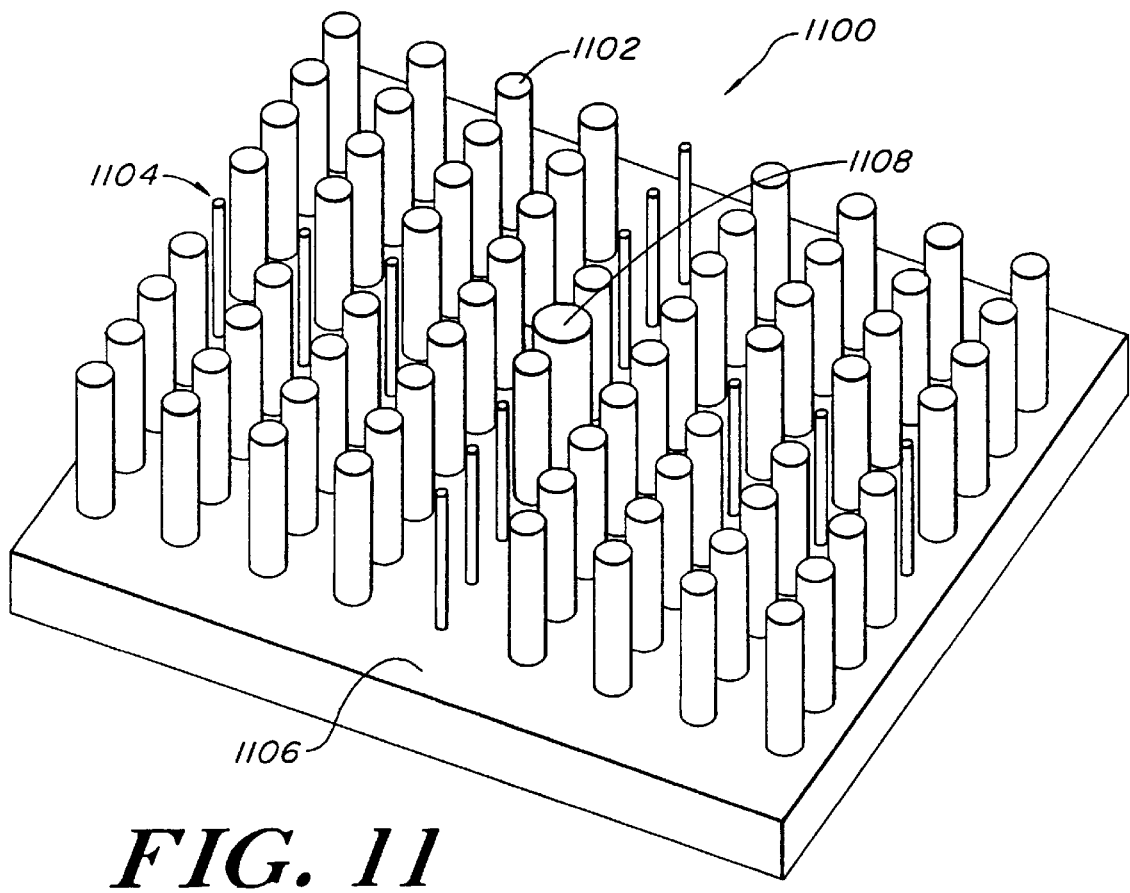
FIG. 11 is a respective view of an exemplary embodiment of a photonic crystal, which corresponds to the embodiment of FIG. 10B for the case of a square lattice of rods.

Consider, for example, a photonic crystal slab. FIG. 10B is a diagram of a two-dimensionally periodic dielectric structure 1010 including intersecting waveguides 1012 and 1014, in which a photonic crystal confines light in two dimensions and index confinement is used in the third dimension. The same principles can be used that were applied in pure photonic crystals, putting a resonant cavity state in the center of the intersection, with modes of the proper symmetry to prevent crosstalk. The result, while probably quite good, will not be a perfect crossing due to radiation out of the plane of the slab. The slab analogue of the two-dimensional square lattice of rods that was used in earlier discussions is shown in FIG. 11. FIG. 11 is a perspective view of an exemplary embodiment of a photonic crystal 1100 which corresponds to the embodiment of FIG. 10B (and thus FIG. 8B) for the case of a square lattice of rods 1102. The photonic crystal includes waveguides 1104 and 1106 formed by decreasing rod radii, and a larger center rod 1108 defining a defect.

Figure 10C:
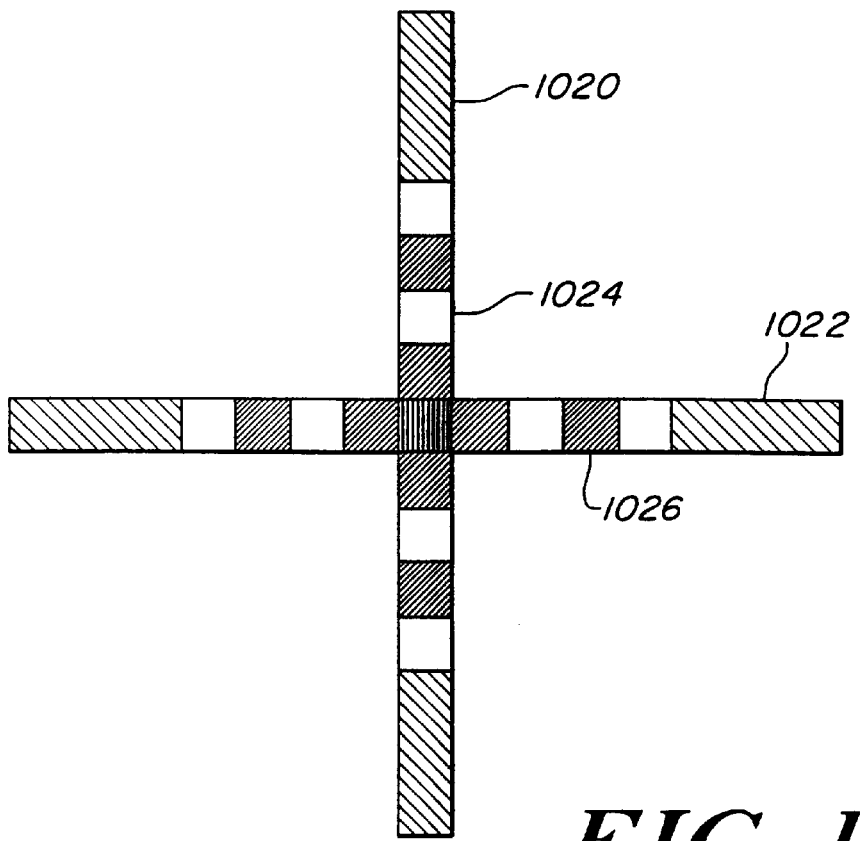
FIG. 10C is a top view of a crossing of conventional waveguides that utilize regions of periodic index variation to define a resonant cavity in the intersection.

Another possibility is to use a crossing of ordinary (index confinement) waveguides, but to add a periodic index variation to trap a resonant mode in the intersection (actually a pair of modes having our required symmetry). FIG. 10C is a top view of a crossing of conventional waveguides 1020 and 1022 that utilize regions 1024 and 1026 of periodic index variation to define a resonant cavity in the intersection. Again, good results with very low crosstalk may be achieved, but the crossing will not be perfect due to radiation losses. In the microwave regime, where metallic waveguides may be used to perfectly confine light, it will be possible to achieve a perfect crossing by our method. A cavity can be constructed in the intersection in a variety of ways. For example, using a one-dimensionally periodic metallo-dielectric photonic crystal. Radiation losses will be prevented by the metallic boundaries of the waveguide, and a perfect crossing will be obtained.

Figure 12A:
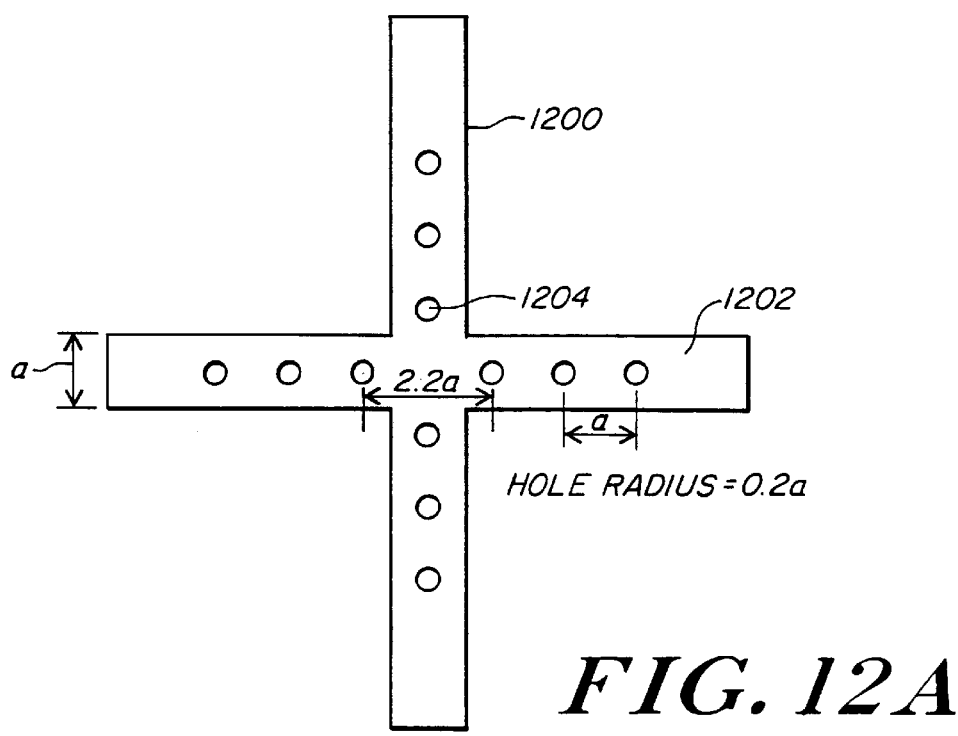
FIGS. 12A and 12B are a top view and perspective view, respectively, of intersecting (index-confinement) waveguides.
Figure 12B:
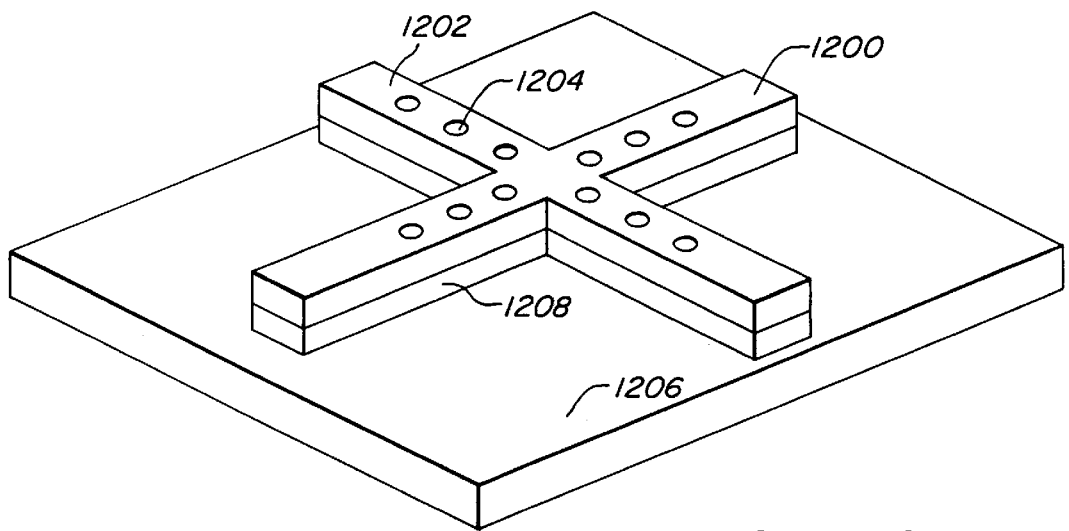

As an example of the application of the crossing methods of the invention to more conventional waveguides, one possible realization of the device shown abstractly in FIG. 10 is provided. FIGS. 12A and 12B are a top view and perspective view of intersecting conventional (index-confinement) waveguides 1200 and 1202, with a dielectric constant of 11.56. Near the intersection, a sequence of holes 1204 is cut out in each waveguide to create a periodic index variation (air/vacuum). These holes create a band gap for the propagation of TE-polarized light down the waveguide, and will allow for the confinement of a resonant state. In the illustrated embodiment, the waveguide has a width of a, the holes are spaced apart by a length of a, the holes have a radius of 0.2a, and the distance between the holes at the intersection is 2.2a. As before, the computations are performed in a two-dimensional system for simplicity, but the same principles apply to three dimensions. The waveguides are supported on a dielectric slab 1206, spaced above the slab by a layer 1208 of lower-dielectric material.

The center of the intersection is a defect in the periodic structure, and the spacing between the center holes has been chosen so that there are a pair of resonant modes in the gap that have the required symmetry. As in the full photonic crystal embodiments, the frequency and symmetry of the resonant modes are easily controlled.

Figure 13:
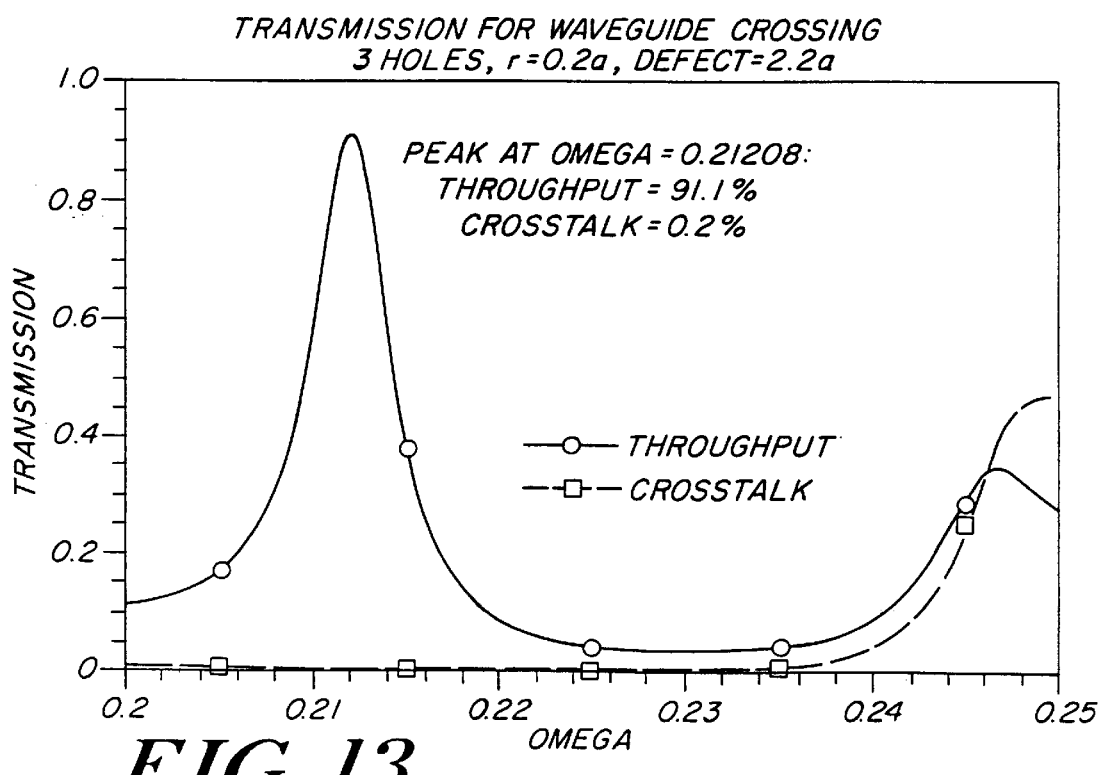
FIG. 13 a graph of the transmission spectrum (throughput and crosstalk) for the waveguide crossing depicted in FIGS. 12A and 12B.

The resulting throughput and crosstalk are shown in FIG. 13. FIG. 13 is a graph of the transmission spectrum (throughput and crosstalk) for the waveguide crossing depicted in FIGS. 12A and 12B. Although the throughput does not reach 100%, the losses are due almost entirely to radiation. Both the crosstalk and the reflection are extremely low. The reflection is not shown, but is less than 0.02% at the frequency of peak throughput. Even the radiation losses could be reduced in a refined version of the structure, e.g., one with a larger number of smaller holes, so it is possible to achieve nearly 100% throughput at resonance.

Figure 14:
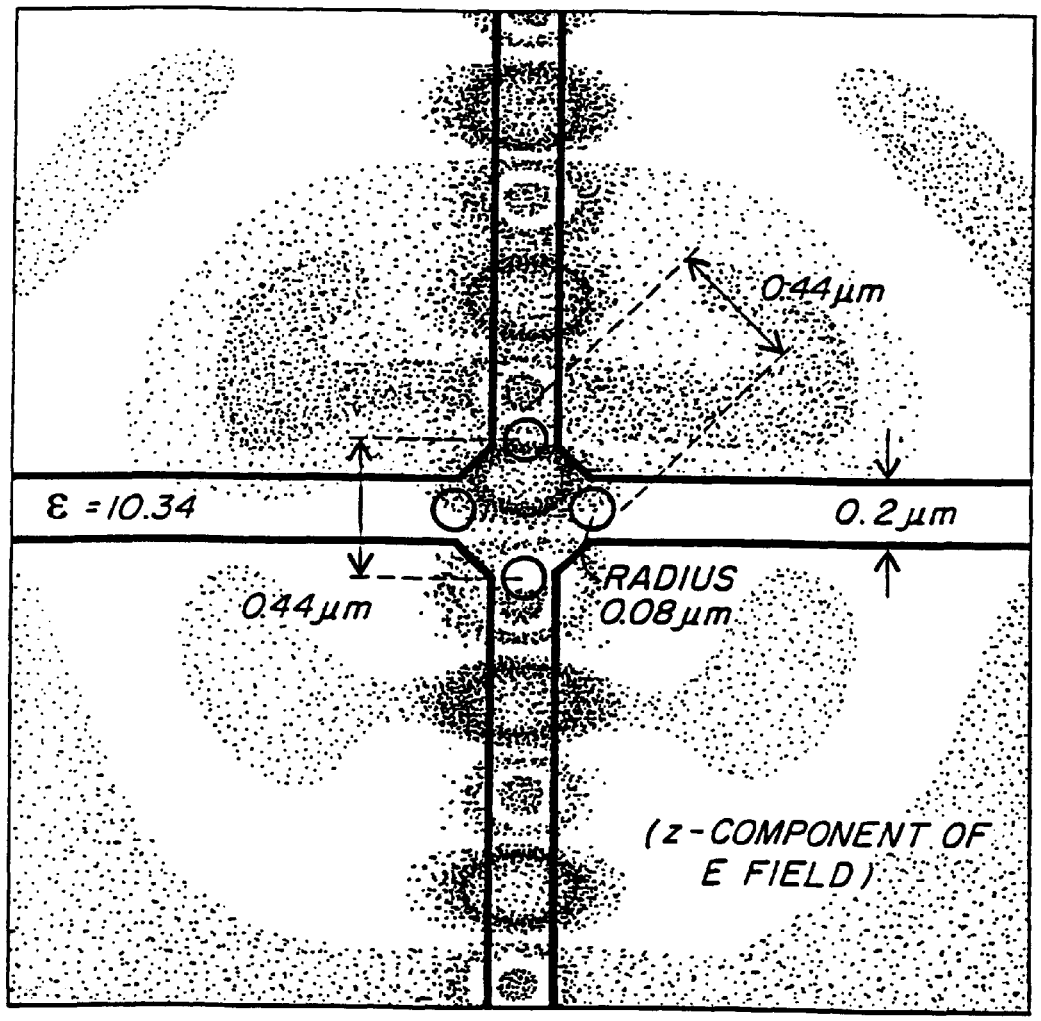
FIG. 14 a top view of a contour of intersecting waveguides with holes overlaying the associated electric field.

An alternative embodiment of a high-dielectric waveguide crossing is shown in FIG. 14. FIG. 14 is a top view of a contour of intersecting waveguides 1400 and 1402 with holes 1404 overlaying the associated electric field. The high-dielectric waveguide crossing (crossed waveguides of dielectric constant 10.34, in air) includes four air holes adjacent the intersection. The shading indicates the electric field of a mode propagating vertically through the intersection (computed via a two-dimensional simulation).

Only one layer of holes 1404 is used, and the light is TM-polarized. Since the index variation is not periodic, there is no defined photonic crystal. Even if the holes were periodic, there would be no photonic band gap for TM-polarized light. The confinement in this case is due primarily to index contrast. All that is necessary is that a pair of resonant modes exists with the proper symmetry (in this case, the cavity is produced by index confinement). Also, in this case, to reduce radiation losses, the corners of the intersection are rounded (hand-tuning the shape of the waveguides to enhance coupling between the waveguide mode and the cavity mode).

Figure 15:
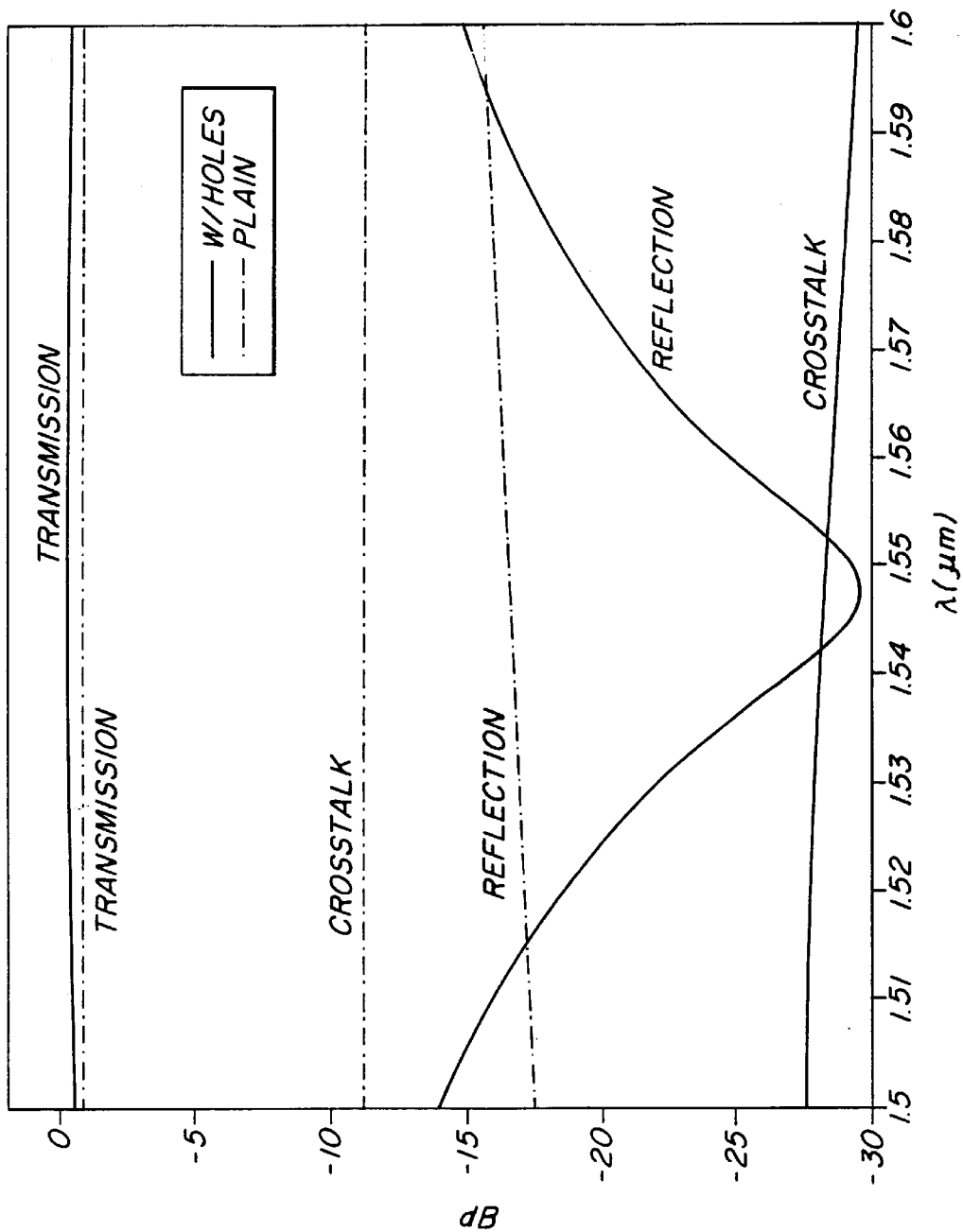
FIG. 15 a graph of transmission (throughput), crosstalk, and reflection profiles (in decibels) for e structure of FIG. 14, both with and without the air holes, plotted versus wavelength.

The resulting transmission profile is shown in FIG. 15, along with the transmission in the case where the holes are omitted (producing much higher crosstalk and reflection). FIG. 15 is a graph of transmission (throughput), crosstalk, and reflection profiles (in decibels) for the structure of FIG. 14, both with and without the air holes, plotted versus wavelength. At the peak wavelength of 1548 nm, the throughput, crosstalk, and reflection are 94%, 0.14%, and 0.11% with the holes, and 82.5%, 7.5%, and 2.2% without the holes.

Although the present invention has been shown and described with respect to several preferred embodiments thereof, various changes, omissions and additions to the form and detail thereof, may be made therein, without departing from the spirit and scope of the invention.

What is claimed is:

1. An optical waveguide structure comprising:
a first waveguide;
a second waveguide that intersects with said first waveguide; and
a photonic crystal resonator system at the intersection of said first and second waveguides.

2. The structure of claim 1, wherein said photonic crystal resonator system comprises at least one localized deviation of periodicity.

3. The structure of claim 2, wherein said photonic crystal resonator system comprises a first resonant mode that couples only to said first waveguide.

4. The structure of claim 3, wherein said photonic crystal resonator system comprises no resonant mode that couples to both said first and second waveguides within the frequency range of said first resonant mode.

5. The structure of claim 4, wherein said photonic crystal resonator system comprises a second resonant mode, which couples only to said second waveguide.

6. The structure of claim 5, wherein said first and second resonant modes comprise substantially the same frequency.

7. The structure of claim 5, wherein said resonator system prevents crosstalk from said second waveguide to said first waveguide.

8. The structure of claim 4, wherein said photonic crystal resonator system prevents crosstalk from said first waveguide to said second waveguide.

9. The structure of claim 1, wherein said resonator system comprises a photonic crystal that is a two-dimensionally periodic dielectric structure.

10. The structure of claim 1, wherein said resonator system comprises a photonic crystal that is a three-dimensionally periodic dielectric structure.

11. The structure of claim 1, wherein said first and second waveguides comprise photonic crystals waveguides.

12. The structure of claim 1, wherein said first and second waveguides comprise metallic waveguides.

13. The structure of claim 1, wherein said photonic crystal comprises a one-dimensionally periodic metallo-dielectric photonic crystal.

14. The structure of claim 1, wherein said first and second waveguides comprise dielectric waveguides.

15. The structure of claim 14, wherein said photonic crystal resonator system comprises a one-dimensionally periodic photonic crystal included in said waveguides.

16. The structure of claim 1, wherein said photonic crystal resonator system comprises at least one mirror plane.

17. An optical waveguide crossing structure comprising:
- a first waveguide that propagates signals in a first direction;
- a second waveguide that intersects with said first waveguide and propagates signals in a second direction; and
- a photonic crystal crossing region at the intersection of said first and second waveguides that prevents crosstalk between the signals of said first and second waveguides.

18. The structure of claim 17, wherein said photonic crystal crossing region comprises at least one defect so as to define a resonant cavity.

19. The structure of claim 18, wherein said photonic crystal comprises a first resonant mode, which couples only to said first waveguide.

20. The structure of claim 19, wherein said photonic crystal comprises no resonant mode that couples to both said first and second waveguides within the frequency range of said first resonant mode.

21. The structure of claim 20, wherein said photonic crystal comprises a second resonant mode, which couples only to said second waveguide.

22. The structure of claim 21, wherein said first and second resonant modes comprise substantially the same frequency.

23. The structure of claim 21, wherein said photonic crystal prevents crosstalk from said second waveguide to said first waveguide.

24. The structure of claim 20, wherein said photonic crystal prevents crosstalk from said first waveguide to said second waveguide.

25. The structure of claim 17, wherein said photonic crystal comprises a two-dimensionally periodic dielectric structure.

26. The structure of claim 17, wherein said photonic crystal comprises a three-dimensionally periodic dielectric structure.

27. The structure of claim 17, wherein said first and second waveguides comprise photonic crystals waveguides.

28. The structure of claim 17, wherein said first and second waveguides comprise metallic waveguides.

29. The structure of claim 17, wherein said photonic crystal comprises a one-dimensionally periodic metallo-dielectric photonic crystal.

30. The structure of claim 17, wherein said first and second waveguides comprise dielectric waveguides.

31. The structure of claim 30, wherein said photonic crystal comprises a one-dimensionally periodic photonic crystal included in said waveguides.

32. The structure of claim 17, wherein said photonic crystal resonator system comprises at least one mirror plane.

33. An optical waveguide structure comprising:
- a first waveguide;
- a second waveguide; and
- a resonator system at the intersection of said first and second waveguides, said intersection possessing a first mirror plane that is parallel to said first waveguide, said resonator system supporting a first resonant mode that includes different symmetry with guided modes in said first waveguide with respect to said first mirror plane, said resonator system substantially reduces crosstalk from said second waveguide to said first waveguide.

34. The structure of claim 33, wherein said resonator system supports a second resonant mode.

35. The structure of claim 34, wherein said second resonant mode comprises different symmetry with a guided mode in said second waveguide with respect to said second mirror plane.

36. The structure of claim 35, wherein said resonator system substantially reduces crosstalk from said first waveguide to said second waveguide.

37. The structure of claim 33, wherein said resonator system comprises a material with tunable dielectric or absorbing properties.

38. The structure of claim 37, wherein said tunable dielectric or absorbing property is controlled by optical means.

39. The structure of claim 37, wherein said tunable dielectric or absorbing property is controlled by electrical means.

40. The structure of claim 37, wherein said tunable dielectric or absorbing property is controlled by mechanical means.

41. The structure of claim 37, wherein said resonator system controls the crosstalk from said second waveguide to said first waveguide.

42. The structure of claim 33, wherein said first waveguide contains a first resonator system.

43. The structure of claim 42, wherein said first resonator system modifies the transmission spectrum within said first waveguide.

44. A method of eliminating signal crosstalk between intersecting waveguides, comprising:
providing a photonic crystal at the intersection of said waveguides.

* * * * *